(12) United States Patent
Embleton et al.

(10) Patent No.: US 10,724,599 B2
(45) Date of Patent: Jul. 28, 2020

(54) TUNED MASS-SPRING DAMPER FOR ELECTRONICS ENCLOSURE

(71) Applicant: DELL PRODUCTS, LP, Round Rock, TX (US)

(72) Inventors: Steven Embleton, Austin, TX (US); Austin M. Shelnutt, Leander, TX (US); Ben J. Sy, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/883,756

(22) Filed: Jan. 30, 2018

(65) Prior Publication Data

US 2019/0234482 A1    Aug. 1, 2019

(51) Int. Cl.
*F16F 15/02*    (2006.01)
*A47B 97/00*    (2006.01)
*A47B 91/02*    (2006.01)

(52) U.S. Cl.
CPC ............ *F16F 15/022* (2013.01); *A47B 91/02* (2013.01); *A47B 97/00* (2013.01); *A47B 2097/008* (2013.01); *F16F 2230/0011* (2013.01)

(58) Field of Classification Search
CPC . F16F 15/022; F16F 2230/0011; A47B 91/02; A47B 97/00; A47B 2097/008; A47L 397/00; A47L 2097/008
USPC ........................................................ 211/26
See application file for complete search history.

(56) References Cited

U.S. PATENT DOCUMENTS

| | | | | | |
|---|---|---|---|---|---|
| 4,402,483 | A | * | 9/1983 | Kurabayashi | E02D 27/34 248/559 |
| 5,100,096 | A | * | 3/1992 | Mizuno | B65D 81/07 248/559 |
| 5,584,406 | A | * | 12/1996 | Besserer | F16M 1/00 211/189 |
| 5,653,070 | A | * | 8/1997 | Seguin | F16F 15/02 248/621 |
| 6,155,660 | A | * | 12/2000 | Nicolai | H02B 1/30 248/635 |
| 6,179,133 | B1 | | 1/2001 | Reece | |
| 6,601,932 | B1 | * | 8/2003 | Helgenberg | H02B 1/301 211/26 |
| 6,889,853 | B2 | * | 5/2005 | Hudz | H05K 7/186 211/26 |
| 6,951,288 | B2 | * | 10/2005 | Henderson | H02B 1/54 211/26 |
| 7,874,433 | B2 | * | 1/2011 | Levesque | H05K 7/1425 211/26 |

(Continued)

OTHER PUBLICATIONS

WorkSafe ISO Base Seismic Isolation Platform; WorkSafe Technologies; 2018; pp. 1-5; https://worksafetech.com/products-ipg/iso-base/.

(Continued)

*Primary Examiner* — Patrick D Hawn
(74) *Attorney, Agent, or Firm* — Larson Newman, LLP (57) ABSTRACT

An equipment rack withstands seismic events using a tuned mass damper. The tuned mass damper is adapted for rack mounting to a shelf, thus allowing the tuned mass damper to be retrofitted into existing rack installations. The tuned mass damper also has variable and/or swappable features to suit the weight, stiffness, and other properties of the equipment rack.

13 Claims, 7 Drawing Sheets

(56) References Cited

U.S. PATENT DOCUMENTS

| | | | | |
|---|---|---|---|---|
| 8,240,490 B2* | 8/2012 | Malekmadani | ...... | A47B 96/024 211/188 |
| 8,613,364 B2* | 12/2013 | Bailey | ......... | H05K 7/1495 211/26 |
| 8,731,774 B2 | 5/2014 | Yang | | |
| 8,967,392 B1* | 3/2015 | Czamara | ......... | F16M 11/00 211/26 |
| 9,144,176 B2* | 9/2015 | Bailey | ......... | H05K 7/1495 |
| 9,485,885 B2* | 11/2016 | Czamara | ......... | F16M 11/00 |
| 9,939,041 B2* | 4/2018 | Kronkright | ...... | F16F 7/01 |
| 10,082,189 B2* | 9/2018 | Kronkright | ...... | F16F 7/01 |
| 2003/0051958 A1* | 3/2003 | Esche | ......... | F16F 7/1005 188/379 |
| 2004/0105655 A1* | 6/2004 | Ciulla | ......... | H05K 7/18 211/26 |
| 2007/0119794 A1* | 5/2007 | Hidaka | ......... | F16F 7/104 211/26 |
| 2008/0282954 A1* | 11/2008 | Reason | ......... | B63B 17/0081 114/71 |
| 2010/0000950 A1* | 1/2010 | Malekmadani | ...... | A47B 57/10 211/26 |
| 2011/0017561 A1* | 1/2011 | Tanaka | ......... | E04B 1/985 188/378 |
| 2011/0094978 A1* | 4/2011 | Bailey | ......... | H05K 7/1495 211/26.2 |
| 2011/0149508 A1* | 6/2011 | Malekmadani | ...... | H05K 7/1489 361/679.48 |
| 2015/0177784 A1 | 6/2015 | Varadarajan et al. | | |
| 2017/0300741 A1 | 10/2017 | Seuss et al. | | |

OTHER PUBLICATIONS

Structural Design of Taipei 101 Tuned Mass Damper; Damping System CTBUH Seoul Conference, Jan. 9, 2004; http://global.ctbuh.org/resources/papers/download/1650-structural-design-of-taipei-101-the-worlds-tallest-building.pdf.

* cited by examiner

TUNED MASS-SPRING DAMPER FOR ELECTRONICS ENCLOSURE

FIELD OF THE DISCLOSURE

The present disclosure generally relates to information handling systems, and more particularly relates to a tuned mass-spring damper for electronics enclosure.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Equipment racks house servers, switches, and other electronic devices. When a rack is installed in a seismic zone, the rack generally is designed to withstand earthquakes and other seismic events. Conventional rack designs, though, are designed to withstand seismic shocks using mechanical hardening. That is, conventional seismic racks are constructed of thick-walled materials that are welded together for stiffness. These conventional seismic racks are large, heavy, and consume greater floor space.

A tuned mass damper allows a conventional equipment rack to withstand seismic events. The tuned mass damper is adapted for rack mounting to a shelf of the equipment rack, thus allowing the tuned mass damper to be retrofitted into existing rack installations. The tuned mass damper also has variable and/or swappable features to suit the weight, stiffness, and other properties of the equipment rack.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
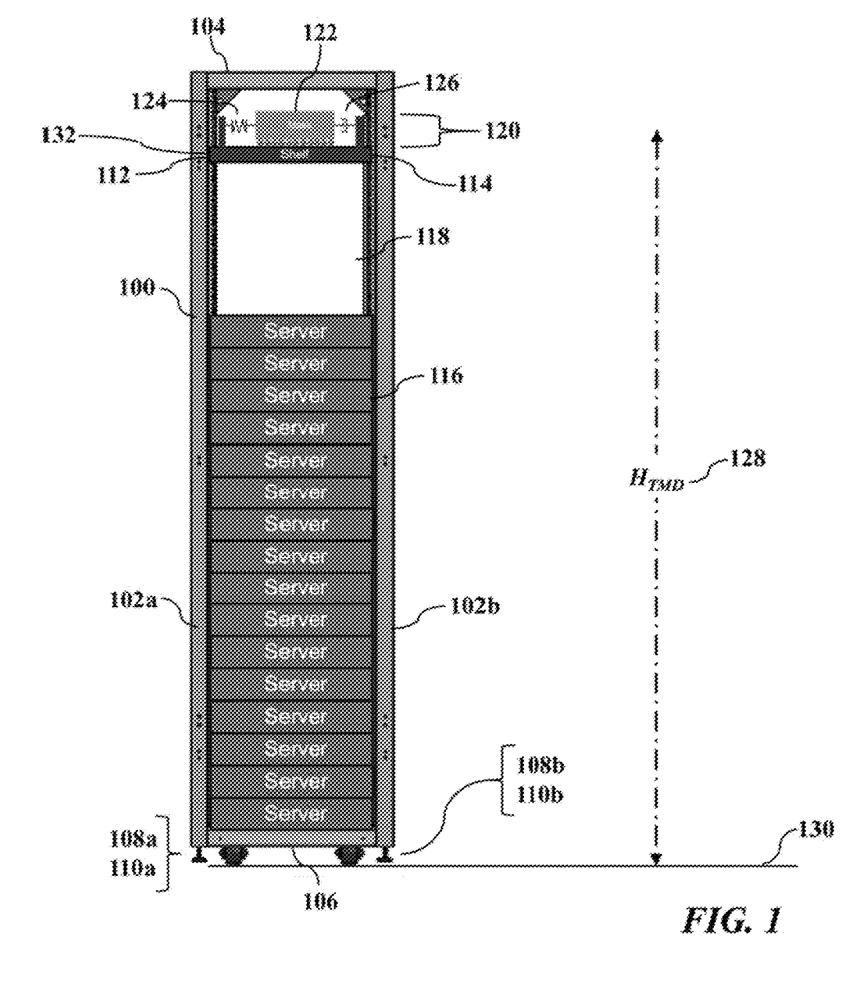
FIGS. 1-2 illustrate an equipment rack, according to exemplary embodiments.
Figure 2:
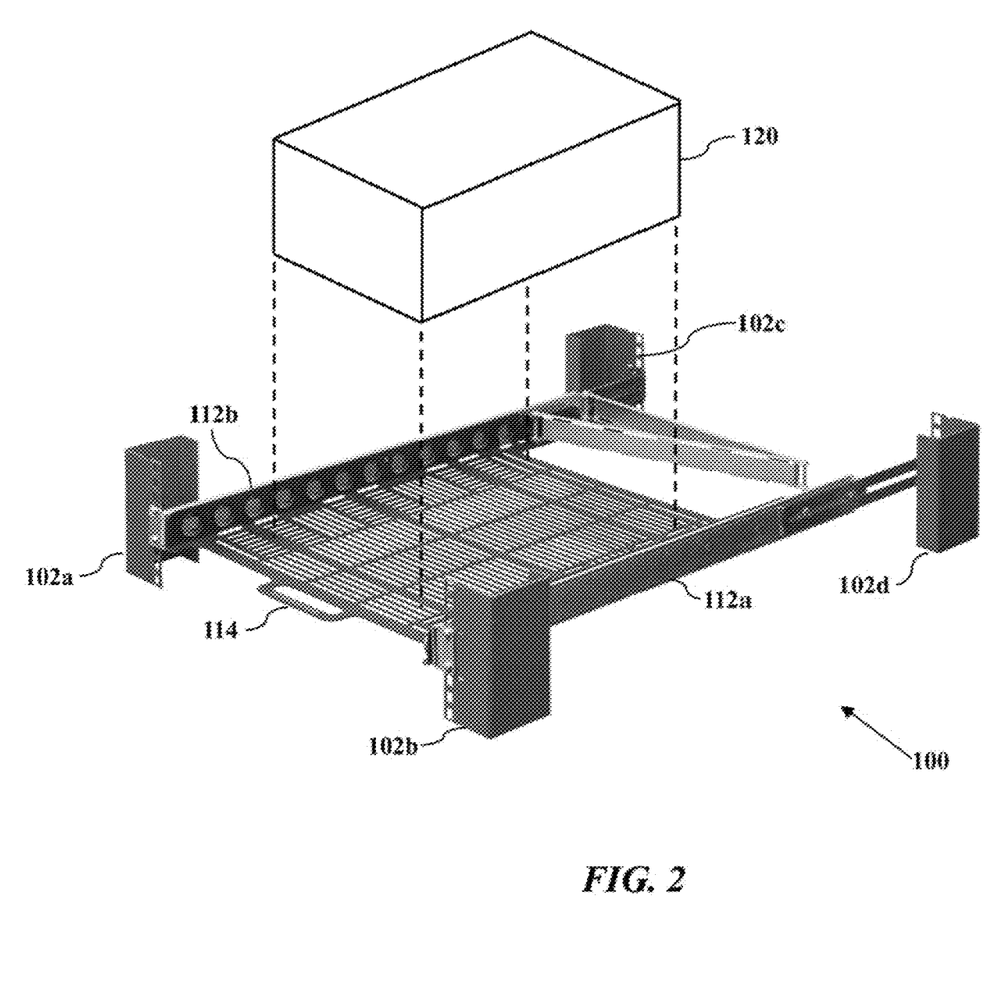

FIGS. 1-2 illustrate an equipment rack 100, according to exemplary embodiments. The equipment rack 100 may have a plurality of generally or substantially vertical supports (illustrated as reference numerals 102a-b). The equipment rack 100 may also have one or more generally or substantially horizontal supports (illustrated as reference numeral 104). The equipment rack 100 may also have top, side, and or bottom panels (not shown for simplicity). The vertical supports 102a-b are connected to a bottom base 106 having an adjustable foot 108 at one or more corner regions 110a-b. FIG. 1 is a front view, so only two (2) vertical supports 102a-b are shown. The equipment rack 100 may have any number (commonly four) of the vertical supports 102 at each corresponding rear corner region 110. As FIG. 2 perhaps best illustrates, the equipment rack 100 may also have parallel, spaced-apart internal rails 112a-b supporting a shelf 114. The equipment rack 100 resembles a cabinet that houses or stacks any equipment. While the equipment rack 100 may contain anything, this disclosure will mainly discuss information technology equipment. That is, FIG. 1 illustrates the equipment rack 100 storing one or more servers 116 and an LED/LCD display device 118, but the equipment rack 100 may additionally or alternatively store switches, power supplies, and/or other information technology equipment. The equipment rack 100 may have lockable front and rear doors (not shown for simplicity) for added security.

The equipment rack 100 also includes a tuned mass damper (or TMD) 120. The tuned mass damper 120 reduces or even substantially eliminates vibrations and/or deflections, especially during wind and seismic events. When an earthquake occurs, vibrations and ground motions can cause the equipment rack 100 to sway and perhaps tip over, thus damaging the information technology equipment. The tuned mass damper 120, though, dynamically controls and damps the motions of the equipment rack 100. In simple words, as the equipment rack 100 moves and oscillates (such as shakes or sways), the tuned mass damper 120 moves out of phase in a lagging fashion, thus reducing the sway of the equipment rack 100. Later paragraphs will provide a greater explanation of harmonic reduction via the tuned mass damper 120.

The tuned mass damper 120 may be located anywhere on the equipment rack 100. In general, the tuned mass damper 120 may be designed to best suit the equipment rack 100. That is, the tuned mass damper 120 may have a mass or gravitational weight 122, a spring 124 (having a spring rate), and a damper 126 (having a damping ratio) that are chosen to best dissipate vibratory motion in the equipment rack 100.

However, a vertical location or height $H_{TMD}$ (illustrated as reference numeral 128) of the tuned mass damper 120 may also be a design parameter. In general, the installation height 128 can affect a natural frequency of the tuned mass damper 120 and/or the equipment rack 100. Higher heights 128 (perhaps as measured from or above a floor 130) may have a greater damping effect, perhaps using smaller masses 122. FIG. 1 thus illustrates the tuned mass damper 120 installed in a top shelf 132 of the equipment rack 100. The tuned mass damper 120 may thus be located as high as possible along the vertical supports 102a-d, perhaps to the top or uppermost horizontal support 104.

Figure 3:
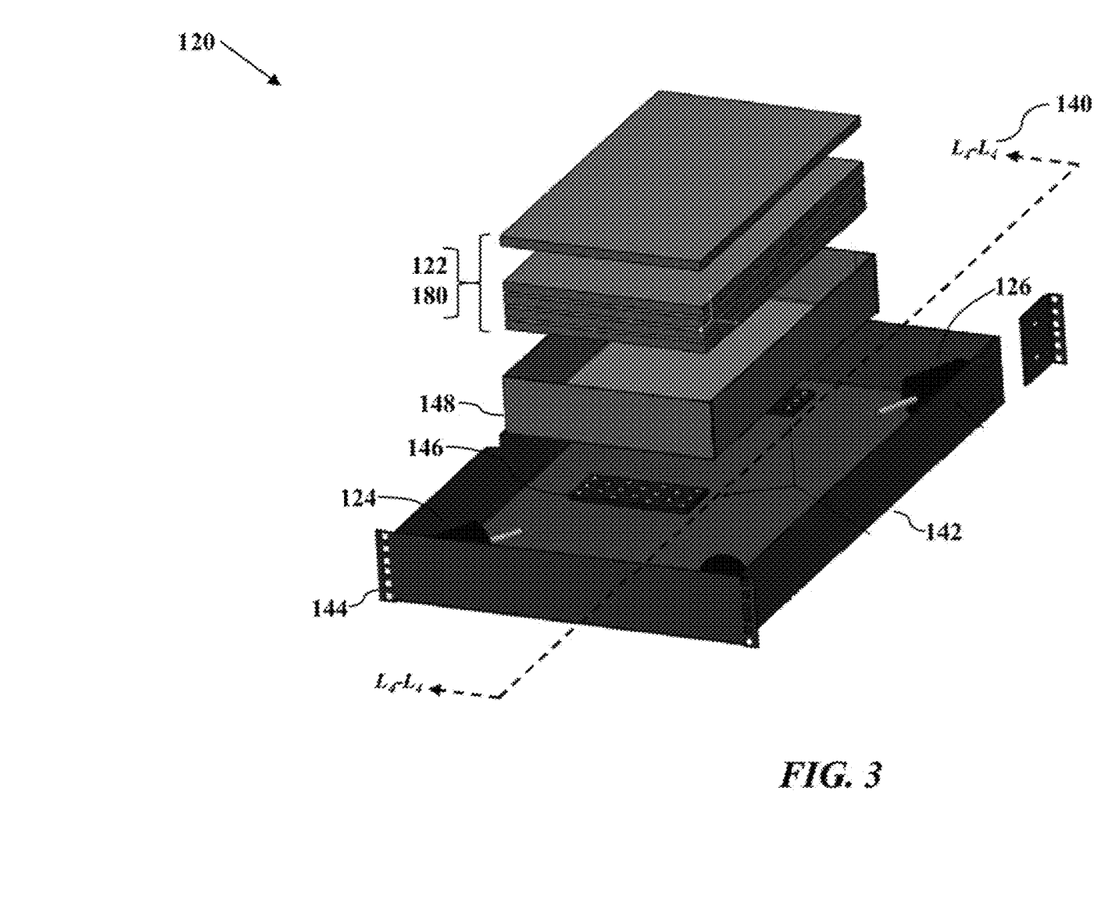
FIGS. 3-5 illustrate a tuned mass damper, according to exemplary embodiments.
Figure 4:
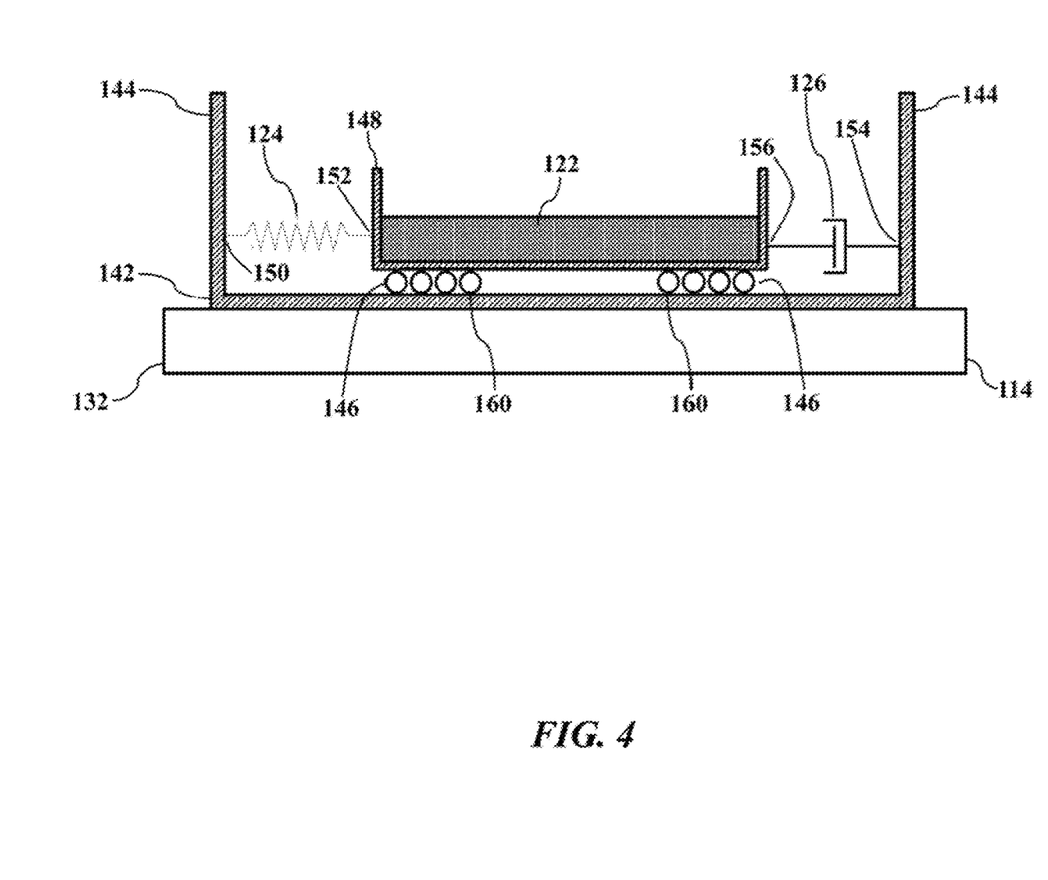

FIGS. 3-5 illustrate more details of the tuned mass damper 120, according to exemplary embodiments. FIG. 3 is an isometric, exploded view of the tuned mass damper 120, while FIG. 4 is a sectional view taken along line $L_4$-$L_4$ (illustrated as reference numeral 140). The tuned mass damper 120 is adapted for a rack-mount within the equipment rack 100 (as illustrated by FIGS. 1-2). A carrier base 142 having sidewalls 144 secures to the internal rails 112a-b (illustrated in FIGS. 1-2) supporting the shelf 114 (such as the top shelf 132). One or more low friction interfaces 146 separate and support the carrier base 142 from a mass tray 148. The mass 122 sits within sidewalls and a floor defining or forming the mass tray 148. Each one or more of the springs 124 has an end 150 connected to the carrier base 142 and another or opposite end 152 connected to the mass tray 148. Each one or more of the dampers 126 have an end 154 connected to the carrier base 142 and another or opposite end 156 connected to the mass tray 148. When oscillatory motion excites the equipment rack 100, the carrier base 142 (connected to the shelf 114 or 132) moves and sways with the equipment rack 100. The mass tray 148 (containing the mass 122) also slides (via the frictionless interface 146) within the carrier base 142. The mass 122, though, moves in lagging resonance to the oscillatory motion of the equipment rack 100 and the carrier base 142 (via the one or more springs 124), and the one or more dampers 126 dissipate kinetic energy of the mass 122 via heat and/or friction. The mass 122 thus oscillates out of phase with the carrier base 142 to drive or to compress the dampers 126. Each damper 126 converts at least some of the kinetic energy of the mass 122 to thermal energy, which reduces the amount of sway in subsequent cycles of the carrier base 142. The general principles of the tuned mass damper 120 are known and need not be repeated.

FIG. 4 also illustrates the low friction interface 146. The low friction interface 146 allows the mass tray 148 to slide or translate independently with respect to the carrier base 142. While the low friction interface 146 may be of any design, an exemplary embodiment includes a bed of spherical ball bearings 160. Each ball bearing 160 may sit and be retained within a concave or spherical depression within the carrier base 142 and/or within the mass tray 148 (not shown for simplicity). The ball bearings 160 mostly or substantially freely spin and rotate, thus allowing the mass tray 148 (containing the mass 122) to ride above and to slide in relation to the carrier base 142. The low friction interface 146, though, may additionally or alternative include a wet or dry lubricant (such as graphite, molybdenum, or any other material) or a slippery solid (such as polytetrafluroethylene, polyoxymethylene, or any other material). Whatever the low friction interface 146, the low friction interface 146 displaces the upper mass tray 148 from the lower carrier base 142. Lateral movement of the carrier base 142 is separated from lateral movement of the mass tray 148.

The tuned mass damper 120 is decoupled from the carrier base 142. Because the carrier base 142 is secured to the equipment rack 100, and because the mass 120 is constrained within the mass tray 148, the motions of the mass 120 are decoupled from the equipment rack 100 in the vertical axis by the low friction interface 146. The mass 120 is also connected to the mass tray 148 in the horizontal plane by the damping and/or compliant elements (that is, the springs 124 and the dampers 126).

The damping effect of the tuned mass damper 120 is now briefly explained. The tuned mass damper 120 is neither counterweight nor ballast, and the tuned mass damper 120 does not move in opposition to the equipment rack 100. The tuned mass damper 120, instead, may slide more (perhaps in millimeters) than the equipment rack 100, but its movements lag the equipment rack 100. The tuned mass damper 120 thus moves or slides slightly out of phase with the equipment rack 100. As an oscillatory gap opens and closes between the tuned mass damper 120 and the equipment rack 100 (such as during a seismic event), the oscillatory motion expands and compresses the springs 124 and the dampers 126. The dampers 126 convert some of the kinetic energy of the mass 122 to thermal energy, which reduces the amount of sway in subsequent cycles and damps the oscillatory motion of the equipment rack 100.

Figure 5:
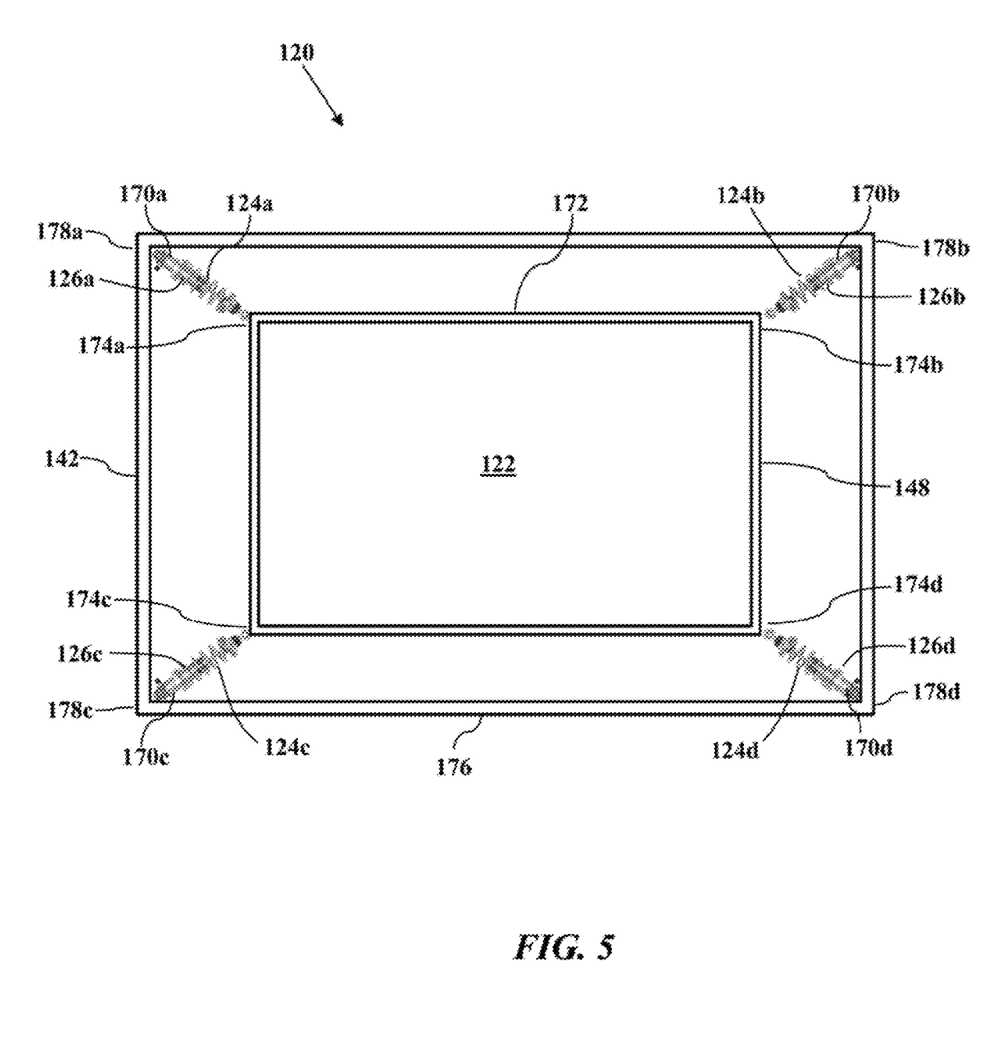

FIG. 5 illustrates corner coil over dampers 170, according to exemplary embodiments. FIG. 5 is a top or plan view of the tuned mass damper 120. Here, though, each spring 124a-d and each damper 126a-d are linearly co-aligned along a longitudinal axis as the corresponding coil over damper 170a-d. Each coil over damper 170a-d absorbs and converts kinetic energy to thermal energy. Each coil over damper 170a-d thus dissipates movement and velocity to reduce sway in the equipment rack 100. As the mass tray 148 moves with respect to the carrier base 142, each coil over damper 170a-d may compress or elongate. Each coil over damper 170a-d thus slows the lateral motion of the mass tray 148 (confining the mass 122) by absorbing its kinetic energy. While exemplary embodiments may utilize any number of the coil over dampers 170, FIG. 5 illustrates four (4) corner units 170a-d. The mass tray 148 has a rectangular shape 172 with corresponding corners 174a-d, while the carrier base 142 has a larger rectangular shape 176 (length and width) with corresponding corners 178a-d. The mass tray 148 slides within the carrier base 142 (via the low friction interface 146 illustrated in FIG. 4), and the coil over dampers 170a-d are attached between adjacent or corresponding corners 174a-d and 176a-d.

The corner coil over dampers 170 may have any design. An exemplary embodiment includes a hydraulic or pneumatic coil over shock absorber that jounces and rebounds to dissipate energy as heat, according to a damping ratio. The damper 126, though, may also have an electromagnetic and/or a magnetorheological mechanism. The damper 126 may additionally or alternatively have a compliant polymer material that compresses and rebounds to dissipate energy. The damper 126 may additionally or alternatively have any spring elements 124 to further absorb the kinetic energy of the moving mass tray 148. While coil springs are shown, the spring 124 may be a longitudinal or transverse leaf attached between the adjacent or corresponding corners 174a-d and 176a-d. The spring 124 may be of any material, such as a metallic and/or polymer material. The spring 124 may also have a piezoelectric characteristic or material that generates electrical charge in response to compression and/or elongation.

The orientation of the springs 124 and the dampers 126 may also be variable. FIG. 4, for example, illustrates the springs 124 and the dampers 126 mostly parallel to, and horizontally aligned with, a floor of the carrier base 142 and/or the mass tray 148. FIG. 5, as another example, illustrates the coil over dampers 170 having an angular orientation with respect to the carrier base 142 and/or the mass tray 148. In general, the orientation of the springs 124 and the dampers 126 may be aligned at an angle that corresponds with the first few oscillatory modes of the equipment rack 100. This angular orientation provides more space for the IT equipment. However, exemplary embodiments may have different mounting locations for the ends 150 and 152 of the springs 124 to achieve variable performance affects. Likewise, the ends 154 and 156 of the dampers 126 may also be altered or changed to affect the oscillatory motion and amplitude of the mass 122 and the equipment rack 100. As a simple example, the carrier base 142 and/or the mass tray 148 may have multiple locations of mounting holes or other attachments for the springs 124 and the dampers 126. The angular orientation of the springs 124 and the dampers 126 may thus be changed to further alter the damping effect of the tuned mass damper 120.

Returning back to FIG. 3, the mass 122 may be adjustable. That is, exemplary embodiments may include features for adjusting the mass 122 contained within the mass tray 148. The mass 122 may be increased, or decreased, to best settle the oscillatory motions of the equipment rack 100. FIG. 3 thus illustrates the mass 122 as stackable plates 180. Each plate 180 is sized to lay or insert within an interior area defined by the rectangular shape 172 of the mass tray 148. The mass tray 148 may thus be a receptacle for the variable mass 122 inserted therein. Each plate 180 has a length, width, thickness, and thus an individual weight 122 (depending on material properties). A user may add or subtract one or more plates 180 within the mass tray 148 to tune or adjust the mass 122 to the equipment rack 100. For example, if the equipment rack 100 sways or oscillates too much, then perhaps more plates 180 should be added to the mass tray 148. Too many plates 180, though, may induce structural stress and other concerns, so the user may remove one or more plates 180 if needed. The user of the tunable mass damper 120 may thus select the number of plates 180 stacked in the mass tray 148 that best suits the equipment rack 100 and the equipment housed therein.

The plates 180 may have variable individual weights. The size, thickness, or volume of the plates 180 may be varied for fine or gross changes to the mass 122 in the mass tray 148. While the plates 180 may be constructed or formed of any material, in general, the plates 180 may be punched, stamped, or cast/molded from a durable metallic material, as this forming technology is readily available and relatively inexpensive. Polymer or plastic materials may also be used if preferred. In short, some material properties may be preferred for certain installations or industries.

Figure 6:
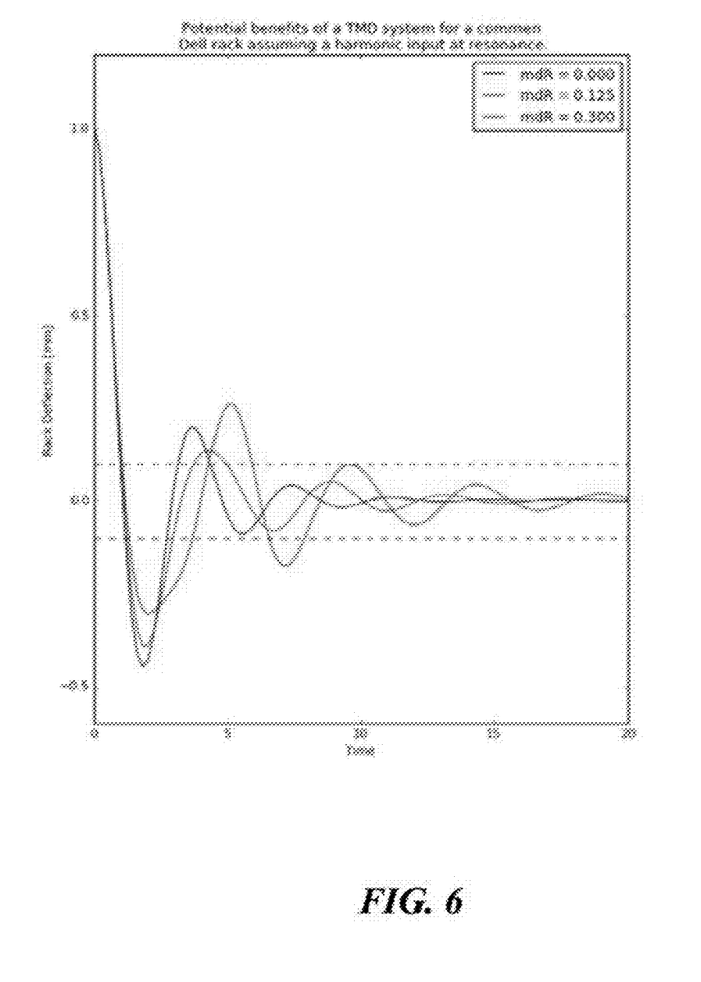
FIGS. 6-7 illustrate tunable parameters of the tuned mass damper, according to exemplary embodiments.
Figure 7:
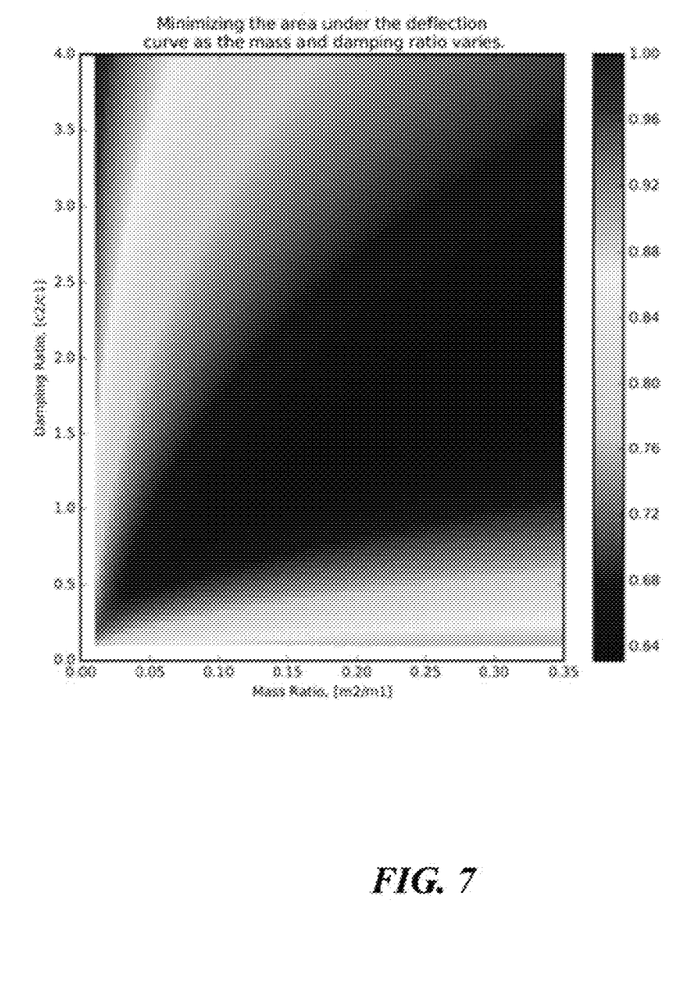

FIGS. 6-7 further illustrate tunable parameters of the tuned mass damper 120, according to exemplary embodiments. Computer modeling of spring-mass-damper designs reveals perhaps optimal parameters for the assembled tuned mass damper 120. FIG. 6, for example, is a graphical plot of deflection in the equipment rack (in millimeters) according to time (seconds), based on different masses installed in the tuned mass damper 120. FIG. 7 is a graphical plot of a damping ratio to the mass ratio (for example the mass 120 to the mass of the equipment rack 100). The analysis modeled the effects of different weights and damping ratios on the harmonic motions of the equipment rack 100. Assuming a harmonic input at resonance, FIG. 6 reveals that approximately a 0.1 ratio of the mass 120 (inserted in the tuned mass damper 120) to the mass of equipment rack 100 provides an acceptable initial deflection with smaller, subsequent harmonic deflections that other mass ratios (0 and 0.3). Similarly, FIG. 7 reveals that the same 0.1 ratio of the mass 120 (inserted in the tuned mass damper 120) to the mass of equipment rack 100, coupled with a relatively small damping ratio of 0.125, minimizes an area under the deflection curve. The analysis thus summarizes the tunable parameters as $$\frac{TMD\ Mass}{Rack\ Mass} \approx 0.1, \text{ and } \frac{TMD\ Damping}{Rack\ Damping} \approx 0.125.$$

Suppose, as a simple example, that the equipment rack 100 has a mass of one hundred (100) kilograms, then the mass 122 may be ten (10) kilograms. The analysis results thus demonstrate that 0.1 ratio is at least a good, initial starting value for the mass 122 in the tuned mass damper 120. A user of the tuned mass damper 120 may combine the interchangeable plates 180 of the mass 122 with an adjustable pre-load on the spring 124. This parameter variability provides an optimal mating of the tuned mass damper 120 (that is, its damping response) to the weight and stiffness of the equipment rack 100. The mass 122, of course, may vary according to the installed height 128 of the tuned mass damper 120 and/or the weight, stiffness, and other performance attributes of the equipment rack 100.

Exemplary embodiments thus provide an elegant solution. The tuned mass damper 120 is installed near, proximate, or even in the top of the equipment rack 100. The tuned mass damper 120 reduces deflection in the top of the rack during a seismic event. The tuned mass damper 120 allows the equipment rack 100 to have increased mass-support (more and/or heavier IT hardware), reduced weight, and a smaller footprint. Moreover, the tuned mass damper 120 has flexible tuning parameters to suit the harmonic and performance characteristics of various rack topologies. Because the mass 122, the spring 124 (spring rate and/or pre-load), and/or the damper 126 (damping ratio) are variable, the tuned mass damper 120 may be adjusted in order to provide optimal mating of the TMD's damping response for a particular rack weight and stiffness.

The tuned mass damper 120 may also be retrofitted to existing installations. Today's networking and computer environments contain thousands of equipment racks housing millions of servers and other information handling systems equipment. Because the tuned mass damper 120 is designed for a rack installation, the tuned mass damper 120 may be easily adapted for a retrofit installation into existing equipment racks. The tuned mass damper 120, for example, may be secured to the existing vertical supports 102, the rails 112, and/or the shelves 114 (all illustrated in FIGS. 1-2) of any existing equipment rack 100. The tuned mass damper 120, in other words, reduces or even eliminates the need for conventional heavy-duty seismic rack construction and reduces the forces experienced by the floor. Minimizing these structural needs allows for the maximization of revenue generating information technology equipment per rack. The tuned mass damper 120 also allows conventional, non-seismic equipment racks (such as EIA 310-D standard racks) to be deployed throughout a data center or other installation, and the tuned mass damper 120 may have adjustable mounting points for any spacing between the rails 112*a-b* (such as 21 inches to 40 inches). The tuned mass damper 120 may additionally or alternatively have mounting brackets for racks with different mounting features (such as Open Compute racks). The tuned mass damper 120 thus provides a narrower overall width, assembly commonality, branding consistency, reduced service complexity, and shorter qualification timeframe.

The tuned mass damper 120 may be tuned to a wide range of equipment racks. For example, because the tuned mass damper 120 has adjustable parameters as explained above, the tuned mass damper 120 may damp rack systems weighing 500-4500 lbs. The mass 120 may be modular and/or swappable, perhaps in discrete large and small weights (such as the plates 180 and/or steel shot), to achieve an ideal weight for optimum damping (such as a steel shot). In other words, mass may be added or subtracted to protect equipment stored in the equipment rack 100. Furthermore, the springs 124 and the dampers 126 may also be tuned, adjusted, or swapped to suite a particular rack weight and stiffness.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as desktop or laptop), tablet computer, mobile device (such as personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An equipment rack comprising:
   a plurality of vertical supports connected to a bottom base;
   a pair of sliding rails connected between topmost regions of the vertical supports, a sliding rail of the pair of sliding rails connected between an adjacent pair of the vertical supports, and another sliding rail of the pair of sliding rails connected between an opposite, adjacent pair of the vertical supports;
   a top shelf connected between the pair of sliding rails to slide in and out of the equipment rack;
   a carrier secured to the top shelf, the carrier having a floor and sidewalls; and
   a mass-spring-damper system damping a deflection of the equipment rack, the mass-spring-damper system having a mass tray supported by the floor within the sidewalls of the carrier, and the mass-spring-damper system having at least one spring-damper system having an end connected to the carrier and an opposite end connected to the mass tray, wherein a ratio of a mass inserted within the mass tray of the mass-spring-damper system to a mass of the equipment rack is about 0.1.

2. The equipment rack of claim 1, wherein the mass-spring-damper system further comprises the mass inserted within the mass tray.

3. The equipment rack of claim 1, further comprising a bottom base connected between the plurality of vertical supports.

4. The equipment rack of claim 3, further comprising an adjustable foot of the bottom base.

5. The equipment rack of claim 1, further comprising a horizontal support connected between the plurality of vertical supports.

6. The equipment rack of claim 1, wherein the mass further comprises at least one plate for insertion within the carrier.

7. The equipment rack of claim 1, further comprising a low friction interface between the mass tray and the floor of the carrier.

8. The equipment rack of claim 1, wherein the mass-spring-damper system includes at least one vertically stackable plate as the mass.

9. The equipment rack of claim 1, wherein the mass-spring-damper system further comprises a swappable spring.

10. The equipment rack of claim 1, wherein the mass-spring-damper system further comprises a swappable damper.

11. The equipment rack of claim 1, wherein the mass-spring-damper system further comprises a spring and a damper in a series arrangement.

12. The equipment rack of claim 1, wherein the mass-spring-damper system further comprises a coil over damper.

13. An equipment rack, comprising:
    a plurality of vertical supports connected to a bottom base;
    a pair of sliding rails connected between topmost regions of the vertical supports, a sliding rail of the pair of sliding rails connected between an adjacent pair of the vertical supports, and another sliding rail of the pair of sliding rails connected between an opposite, adjacent pair of the vertical supports;
    a top shelf connected between the pair of sliding rails to slide in and out of the equipment rack; and
    a rectangular carrier secured to the top shelf, the rectangular carrier having a floor and sidewalls; and
    a tuned mass damper damping a deflection of the equipment rack, the tuned mass damper installed within the sidewalls of the rectangular carrier, the tuned mass damper comprising:
      a mass tray confined within the sidewalls of the rectangular carrier, the mass tray containing a plurality of vertically stackable plates as a mass;
      ball bearings separating the floor of the rectangular carrier from the mass tray; and a coil-over damper system having an end connected to the mass tray and an opposite end connected to a corner of the sidewalls of the rectangular carrier;
wherein the mass contained within the mass tray and a mass of the equipment rack has a ratio of about 0.1.

* * * * *